(12) United States Patent
Probasco et al.

(10) Patent No.: US 9,009,178 B2
(45) Date of Patent: Apr. 14, 2015

(54) METHOD AND APPARATUS FOR REGULATORY DATABASE PROTOCOL DISCOVERY

(75) Inventors: Michael Scott Probasco, Bedford, TX (US); Basavaraj Patil, Coppell, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/339,036

(22) Filed: Dec. 28, 2011

(65) Prior Publication Data

US 2013/0173651 A1      Jul. 4, 2013

(51) Int. Cl.
*G06F 17/30* (2006.01)
*H04L 12/24* (2006.01)

(52) U.S. Cl.
CPC ...... *G06F 17/30386* (2013.01); *H04L 41/0806* (2013.01)

(58) Field of Classification Search
CPC .................. H04L 41/0806; G06F 17/30386
USPC ........................................ 707/758; 709/222
See application file for complete search history.

(56) References Cited

U.S. PATENT DOCUMENTS

| | | | |
|---|---|---|---|
| 2005/0119926 A1* | 6/2005 | Turetsky et al. | 705/8 |
| 2006/0068786 A1* | 3/2006 | Florence | 455/435.2 |
| 2009/0012986 A1* | 1/2009 | Arazi et al. | 707/102 |
| 2011/0143761 A1 | 6/2011 | Uusitalo et al. | |
| 2011/0195667 A1 | 8/2011 | Hassan et al. | |
| 2011/0218928 A1* | 9/2011 | Refior et al. | 705/310 |
| 2011/0310815 A1 | 12/2011 | Kim et al. | |
| 2011/0317632 A1* | 12/2011 | Bahl et al. | 370/329 |

FOREIGN PATENT DOCUMENTS

| | | |
|---|---|---|
| WO | WO 2011/093642 A2 | 8/2011 |
| WO | WO 2011/102897 A1 | 8/2011 |
| WO | WO 2011/115449 A2 | 9/2011 |
| WO | WO 2011/122763 A2 | 10/2011 |
| WO | WO-2011/123501 | 10/2011 |

OTHER PUBLICATIONS

Gulbrandsen et al., A DNS RR for specifying the location of services, RFC 2782, Feb. 2000.*
Zurutuza, N., Cognitive Radio and TV White Space Communications, TV White Space Geo-Location Database System, Norwegian University of Science and Technology, Jun. 2011, 145 pages.
International Search Report and Written Opinion of the Search Authority for Application No. PCT/FI2012/051049; dated Feb. 5, 2013.

* cited by examiner

*Primary Examiner* — William Spieler
(74) *Attorney, Agent, or Firm* — Alston & Bird LLP (57) ABSTRACT

Methods, apparatuses, and computer program products herein enable a mobile terminal with a cognitive radio to determine at least one white space spectrum database to access based on a current location and once the at least one white space spectrum database is accessed to determine the relevant communication protocols. One example method may include accessing one or more white space database identifiers. In some example embodiments, the white space database identifiers correspond to a white space database assigned to a region. The method may further include determining whether the one or more database identifiers match a database identifier associated with a schema In some example embodiments, the schema defines one or more parameters for exchanging information with a white space spectrum database. The method may further include selecting the schema that is associated with the matched database identifier.

14 Claims, 3 Drawing Sheets

METHOD AND APPARATUS FOR REGULATORY DATABASE PROTOCOL DISCOVERY

TECHNOLOGICAL FIELD

Embodiments of the present invention relate generally to wireless communications technology and, more particularly, relate to a method, apparatus, and computer program product for facilitating wireless communications over a regulated frequency band.

BACKGROUND

Many governments around the world are creating regulations that allow a cognitive radio (CR) to operate in certain frequency bands (e.g. whitespace frequency bands). For example, the Federal Communications Commission (FCC) in the United States has already passed such regulations, Office of Communications (OFCOM) in the UK has announced it will develop such regulations, the European Conference of Postal and Telecommunications Administrations (CEPT)/Electronic Communications Committee (ECC) in Europe is also developing requirements for regulations. To access the white space bands, each regulatory group generally may request that the CR perform a lookup into a white space spectrum database before it can transmit. This lookup is required in order to prevent the CR transmissions, for example, from interfering with other transmissions on a white space frequency band.

Each regulatory group will likely write slightly different regulations defining how a CR and a white space spectrum database are to interoperate. While the concept remains generally the same, each country or region may have slightly different variations in precisely what information is exchanged between the CR and a white space spectrum database. The Internet Engineering Task Force (IETF) Protocol to Access White Space database (PAWS) working group is also defining a standards track protocol which can be used globally by devices to contact a white space spectrum database. This protocol may satisfy the regulations of each country or region. While the protocol enables a common language for communication between CR and database, each region may have a separate dialect of this protocol in order to properly implement the variations in requirements. One example is that the regulations in the US do not include a maximum transmit power for a given radio frequency; while the preliminary requirements in Europe do include a maximum transmit power for each frequency. Even with the variance between regulatory requirements of different countries, current CR's are generally configured for a single regulatory environment.

BRIEF SUMMARY

Methods, apparatuses, and computer program products herein enable a white space device with a CR, having completed the discovery of at least one accessible white space spectrum database, to determine the relevant communication protocols and/or schema for the at least one white space spectrum database. In some example embodiments, the example white space device may send a message to a white space spectrum database with its current location, in response the white space spectrum database may provide a schema that defines variable parameters for the protocol (for example, the dialect) for communicating with the white space spectrum database. In an instance in which an example white space spectrum database does not support the white space devices current location, then an empty schema may be returned. Alternatively or additionally a uniform resource locator or universal resource locator (URL) of another white space database, or database aggregator, which does support the white space devices current location may be returned.

In one embodiment, a method is provided that comprises accessing one or more white space database identifiers. In some example embodiments, the white space database identifiers correspond to a white space database assigned to a region. The method of this embodiment may also include determining whether the one or more database identifiers match a database identifier associated with a schema. In some example embodiments, the schema defines one or more parameters for exchanging information with a white space spectrum database. The method of this embodiment may also include selecting the schema that is associated with the matched database identifier.

In one embodiment, a method is provided that comprises causing one or more white space spectrum databases to be queried with a current location in an instance in which the one or more database identifiers do not match a database identifier associated with a schema. The method of this embodiment may also include receiving an indication of a schema to be used in the current location from the one or more white space spectrum databases.

In one embodiment, a method is provided that comprises causing a domain name system query to be transmitted to a domain name system server. The method of this embodiment may also include receiving a white space database record type record that indicates a regulatory domain and schema that is associated with the white space spectrum database.

In another embodiment, an apparatus is provided that includes at least one processor and at least one memory including computer program code with the at least one memory and the computer program code being configured, with the at least one processor, to cause the apparatus to at least access one or more white space database identifiers. In some example embodiments, the white space database identifiers correspond to a white space database assigned to a region. The at least one memory and computer program code may also be configured to, with the at least one processor, cause the apparatus to determine whether the one or more database identifiers match a database identifier associated with a schema. In some example embodiments, the schema defines one or more parameters for exchanging information with a white space spectrum database. The at least one memory and computer program code may also be configured to, with the at least one processor, cause the apparatus to select the schema that is associated with the matched database identifier.

In the further embodiment, a computer program product may be provided that includes at least one non-transitory computer-readable storage medium having computer-readable program instruction stored therein with the computer-readable program instructions including program instructions configured to access one or more white space database identifiers. In some example embodiments, the white space database identifiers correspond to a white space database assigned to a region. The computer-readable program instructions may also include program instructions configured to determine whether the one or more database identifiers match a database identifier associated with a schema. In some example embodiments, the schema defines one or more parameters for exchanging information with a white space spectrum database. The computer-readable program instructions may also include program instructions configured to select the schema that is associated with the matched database identifier.

In yet another embodiment, an apparatus is provided that includes means for accessing one or more white space database identifiers. In some example embodiments, the white space database identifiers correspond to a white space database assigned to a region. The apparatus of this embodiment may also include means for determining whether the one or more database identifiers match a database identifier associated with a schema. In some example embodiments, the schema defines one or more parameters for exchanging information with a white space spectrum database. The apparatus of this embodiment may also include means for selecting the schema that is associated with the matched database identifier.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

Figure 1:
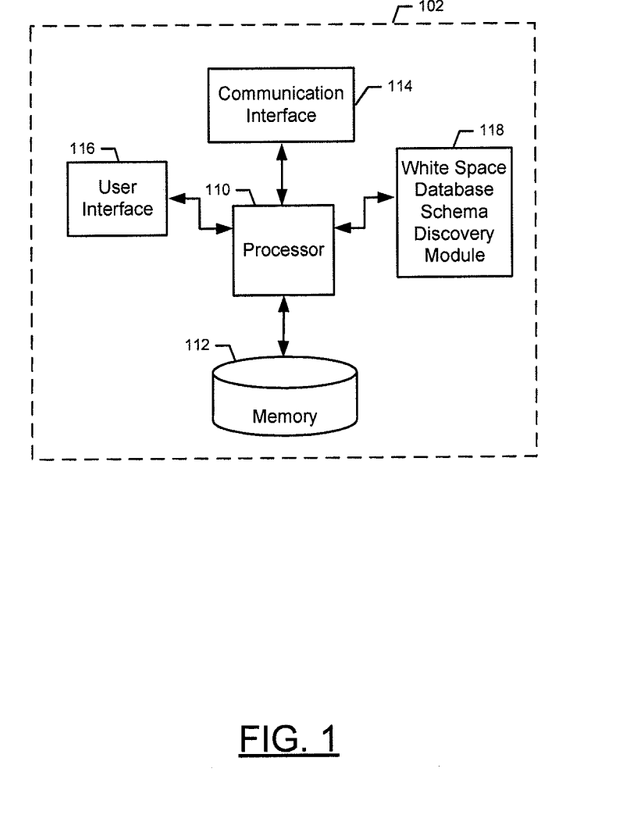
FIG. 1 illustrates an example block diagram of an example database protocol discovery apparatus according to some example embodiments of the present invention.

FIG. 1 illustrates a block diagram of a database protocol discovery apparatus 102. In an instance in which at least one database has been discovered, a white space device, such as a mobile terminal, an access point or other device having a CR, may then determine a schema and/or protocol to communicate with the white space spectrum database and then may cause certain information to be presented to the white space spectrum database (for example, lat/long of the CR, global positioning system coordinates, radio transmit power, or device class). In some example embodiments, a white space spectrum database may comprise a white space database as defined by the FCC, CEPT/ECC, OFCOM or the like. The database may then compare this information with internal records and then may reply to the CR with a list of vacant channels where the CR can transmit (if any channels are vacant). Advantageously, in some example embodiments the CR may then enable a communication on a vacant white space channel.

It will be appreciated that the database protocol discovery apparatus 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for database protocol discovery, other configurations may also be used to implement embodiments of the present invention.

The database protocol discovery apparatus 102 may be embodied as a desktop computer, laptop computer, mobile terminal, mobile computer, tablet, mobile phone, mobile communication device, one or more servers, one or more network nodes, game device, digital camera/camcorder, audio/video player, television device, radio receiver, digital video recorder, positioning device, any combination thereof, and/or the like. In some example embodiments, the database protocol discovery apparatus 102 may be embodied as a mobile terminal, such as that illustrated in FIG. 2.

Figure 2:
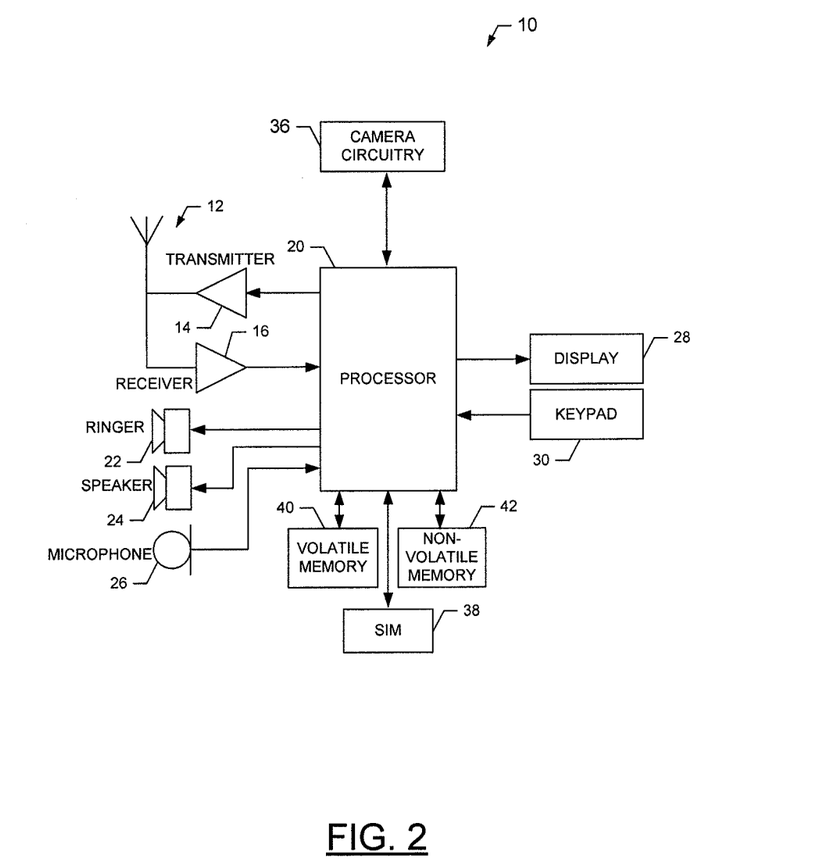
FIG. 2 is an example schematic block diagram of an example mobile terminal according to some example embodiments of the present invention.

In this regard, FIG. 2 illustrates a block diagram of a mobile terminal 10 representative of some example embodiments of a database protocol discovery apparatus 102. It should be understood, however, that the mobile terminal 10 illustrated and hereinafter described is merely illustrative of one type of database protocol discovery apparatus 102 that may implement and/or benefit from embodiments of the present invention and, therefore, should not be taken to limit the scope of the present invention. While several embodiments of the mobile terminal (for example, mobile terminal 10) are illustrated and will be hereinafter described for purposes of example, other types of mobile terminals, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively.

The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local area network (WLAN) techniques such as Institute of Electrical and Electronics Engineers (IEEE) 802.11, wireless metropolitan area network (WMAN) techniques such as IEEE 802.16, wireless regional area network (WRAN) techniques such as IEEE 802.22, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal 10 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), wireless microphone systems, as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols. Additionally, the mobile terminal 10 may be capable of operating using a CR, that is configured to allow for wireless communications on white space frequency bands, for example unused white space frequency bands.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal 10 may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

The mobile terminal 10 may include a media capturing element, such as a camera, video and/or audio module, in communication with the processor 20. The media capturing element may comprise any means for capturing an image, video and/or audio for visual search, storage, display or transmission. For example, in some example embodiments in which the media capturing element comprises camera circuitry 36, the camera circuitry 36 may include a digital camera configured to form a digital image file from a captured image. In addition, the digital camera of the camera circuitry 36 may be configured to capture a video clip. As such, the camera circuitry 36 may include all hardware, such as a lens or other optical component(s), and software necessary for creating a digital image file from a captured image as well as a digital video file from a captured video clip. Alternatively, the camera circuitry 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera circuitry 36 may be displayed on the display 28 of the mobile terminal 10 to illustrate a view of an image currently displayed which may be captured if desired by the user. As such, a captured image may, for example, comprise an image captured by the camera circuitry 36 and stored in an image file. As another example, a captured image may comprise an object or objects currently displayed by a display or viewfinder of the mobile terminal 10, but not necessarily stored in an image file. In some example embodiments, the camera circuitry 36 may further include a processing element such as a co-processor configured to assist the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include other non-transitory memory, such as volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, or magnetic tape), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an identifier specific to white space radio network operation (e.g. FCC identification or FCCID) and/or an international mobile equipment identification (IMEI) code, capable of uniquely identifying the mobile terminal 10.

Returning to FIG. 1, in some example embodiments, the database protocol discovery apparatus 102 includes various means for performing the various functions herein described. These means may comprise one or more of a processor 110, memory 112, communications interface 114, user interface 116, and/or white space database schema (e.g. protocol) discovery module 118. The means of the database protocol discovery apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 112) that is executable by a suitably configured processing device (for example, the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the database protocol discovery apparatus 102 as described herein. The plurality of processors may be embodied on a single computing device or distributed across a plurality of computing devices collectively configured to function as the database protocol discovery apparatus 102. In embodiments wherein the database protocol discovery apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the database protocol discovery apparatus 102 to perform one or more of the functionalities as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, non-transitory memory, such as volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the database protocol discovery apparatus 102. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the database protocol discovery apparatus 102 is embodied as a mobile terminal 10, the memory 112 may comprise the volatile memory 40 and/or the non-volatile memory 42. The memory 112 may be configured to store information, data, applications, instructions, or the like for enabling the database protocol discovery apparatus 102 to carry out various functions in accordance with various example embodiments. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, a table which may contain a mapping of databases to a particular regulatory domain and a protocol dialect to use. This stored information may be stored and/or used by the white space database schema discovery module 118 during the course of performing its functions.

The communications interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data to/from another computing device. For example, the communications interface 114 may be configured to receive protocol and/or schema data over a network. In this regard, in embodiments wherein the database protocol discovery apparatus 102 comprises a server, network node, or the like, the communications interface 114 may be configured to communicate with a remote mobile terminal to allow the mobile terminal and/or a user thereof to access the regulatory database functionality provided by the database protocol discovery apparatus 102. In some example embodiments, the communications interface 114 is at least partially embodied as or otherwise controlled by the processor 110. In this regard, the communications interface 114 may be in communication with the processor 110, such as via a bus. The communications interface 114 may include, for example, an antenna, a transmitter, a receiver, a transceiver and/or supporting hardware or software for enabling communications with one or more remote computing devices. The communications interface 114 may be configured to receive and/or transmit data using any protocol that may be used for communications between computing devices, for example by using a cognitive radio. In this regard, the communications interface 114 may be configured to receive and/or transmit data using any protocol that may be used for transmission of data over a wireless network, wireline network, some combination thereof, or the like by which the database protocol discovery apparatus 102 and one or more computing devices are in communication. The communications interface 114 may additionally be in communication with the memory 112, user interface 116, and/or a white space database schema discovery module 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the database protocol discovery apparatus 102 is embodied as one or more servers, aspects of the user interface 116 may be reduced or the user interface 116 may even be eliminated. The user interface 116 may be in communication with the memory 112, communications interface 114, and/or the white space database schema discovery module 118, such as via a bus.

The white space database schema discovery module 118 may be embodied as various means, such as circuitry, hardware, a computer program product comprising computer readable program instructions stored on a computer readable medium (for example, the memory 112) and executed by a processing device (for example, the processor 110), or some combination thereof and, in one some example embodiments, is embodied as or otherwise controlled by the processor 110. In embodiments wherein the white space database schema discovery module 118 is embodied separately from the processor 110, the white space database schema discovery module 118 may be in communication with the processor 110. White space database schema discovery module 118 may further be in communication with one or more of the memory 112, communications interface 114, and/or the user interface 116, such as via a bus.

The white space database schema discovery module 118 may be configured to access a discovered fully qualified domain name (FQDN) or uniform resource locator or universal resource locator (URL) associated with a white space spectrum database. The white space database schema discovery module 118 may further be configured to determine a current location of a mobile terminal 10. The white space database schema discovery module 118 may then cause a first message, containing its location and/or additional information (for example, radio transmit power, or device class), to be transmitted to the database, such as by the communications interface 114 or the like. In some example embodiments, the database may reply with the schema which defines variable parameters for a protocol (for example, PAWS dialect). As described herein, the schema information may be provided in the form of a mask. A mask may define those attributes, out of a standard set of attributes used to communicate with all white space databases that are relevant in a specific regulatory domain. Applying the mask against the standard set of attributes may provide a schema to be used for a particular white space database at a given location.

The schema and/or protocol may include optional messages and information elements that are to be used when communicating with the database. These optional messages and information elements may be determined by local regulations, for example, the regulations a mobile terminal must adhere to while operating on regional white space spectrum frequency bands. The database may further reply, in some example embodiments, with an identity of a base level or template schema, a regulatory region, and/or a mask value. Alternatively or additionally, if the database does not support the region where the device is currently located, the database may return an empty schema, or the URL of a database, or database aggregator, which does serve the region.

In some example embodiments, the white space database schema discovery module 118 may cause a table, which contains a mapping of one or more databases to a protocol and/or schema that is specific to regulatory a domain to be stored in the memory 112. In particular the table may include one or more URL's and/or FQDN's corresponding to one or more white space spectrum databases and the corresponding schema and/or protocol used to communicate with the one or more white space spectrum databases. Additionally the table may include an identity of a base-level or template schema, a regulatory region and/or a mask value. This table may be provisioned via various means, such as by regular updates caused by the white space database schema discovery module 118.

The white space database schema discovery module 118 may be configured to query the table with the discovered FQDN or URL associated with a white space spectrum database. If the discovered FQDN or URL matches an entry in the table, the matching schema may be selected and may enable communication with the white space spectrum database.

The white space database schema discovery module 118 may also be configured to construct a DNS query that comprises the discovered FQDN or URL associated with a white space spectrum database and, when transmitted, is configured to request a white space databases resource record. The white space database schema discovery module 118 may then cause the DNS query to be transmitted, such as by communications interface 114. The DNS server may maintain a list of records associated with various white spaces database and may further contain a resource record with information about the regulatory domain and the database schema to be used for querying the white space database itself. The DNS server may then use the FQDN and/or URL is the DNS query to determine the proper resource record to provide in response to the query.

An example DNS transaction may include but is not limited to, the white space database schema discovery module 118 constructs a DNS query such as (FQDN: wsdb.companyx.co.uk, Type: WSDB Resource-Record). The DNS query is then caused to be transmitted, such as via the communications interface 113, to the DNS server. The DNS server address may be configured via DHCP or may be stored in the memory 112. The DNS server may receive the DNS query and then may conduct a resolution process (e.g. transmit DNS query to another DNS server in a DNS server hierarchy). In some example embodiments, the DNS may identify a white space database resource record that meets the criteria in the query, such as, in an instance in which the FQDN or URL in the DNS query matches the FQDN or URL of the resource record. The white space database schema discovery module 118 may then receive the resource record, such as by the communications interface 114. The resource record may include parameters which describe the regulatory domain of the associated white space database and, the schema to be used with the white space database for queries. The white space database schema discovery module 118 is configured to use the information contained in the resource record to build a query for the white space database using the schema information contained therein.

Figure 3:
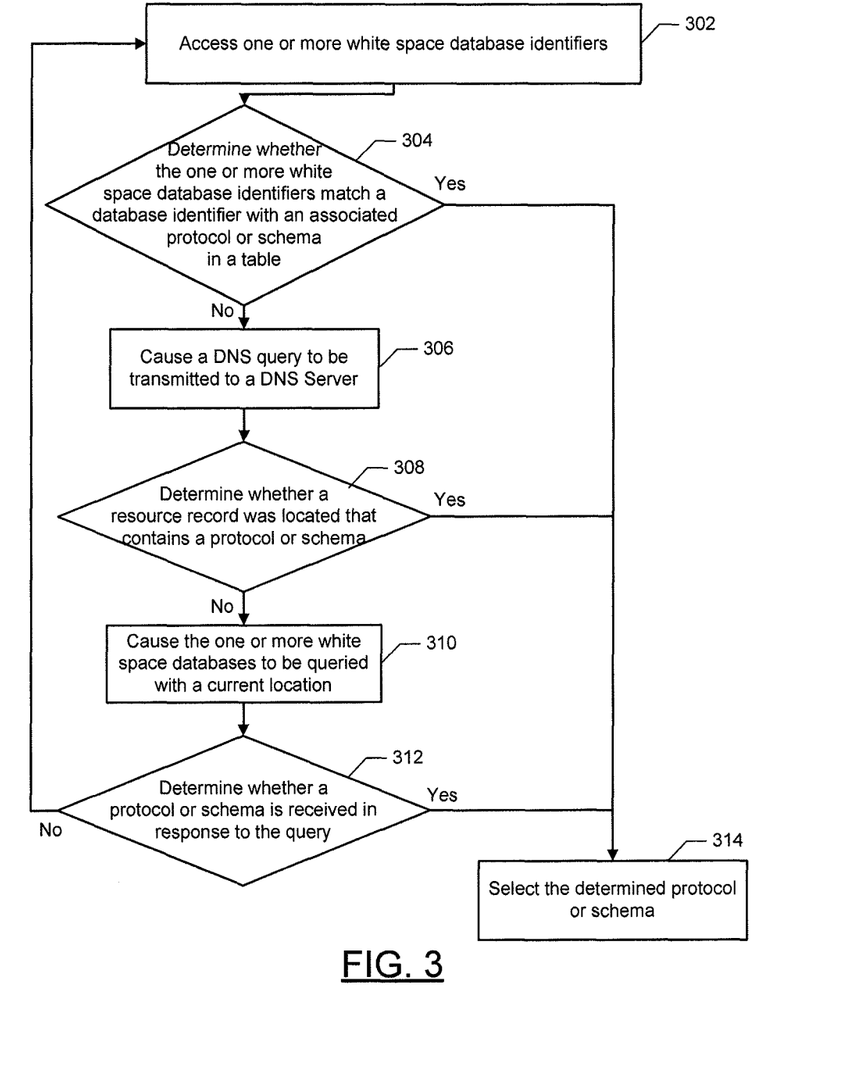
FIG. 3 illustrates a flowchart according to an example method for discovering a protocol or schema according to some example embodiments of the invention.

FIG. 3 illustrates example flowcharts of the example operations performed by a method, apparatus and computer program product in accordance with some example embodiments of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 112 of an apparatus employing an embodiment of the present invention and executed by a processor 110 in the apparatus. As will be appreciated, any such computer program instructions may be loaded onto a computer or other programmable apparatus (for example, hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 3, when executed, convert a computer or processing circuitry into a particular machine configured to perform some example embodiments of the present invention. Accordingly, the operations of FIG. 3 define an algorithm for configuring a computer or processing to perform some example embodiments. In some cases, a general purpose computer may be provided with an instance of the processor which performs the algorithms of FIG. 3 to transform the general purpose computer into a particular machine configured to perform some example embodiments.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 3 illustrates a flowchart according to an example method for discovering a regulatory database protocol according to some example embodiments of the invention. As shown in operation 302, the apparatus 102 may include means, such as the processor 110, the white space database schema discovery module 118, or the like, for accessing one or more white space database identifiers (e.g. URL). In some example embodiments, the one or more white space database identifiers may be accessed in the memory 112 or using a remote connection via communications interface 114. As shown in decision operation 304, the apparatus 102 may include means, such as the processor 110, the memory 112, the white space database schema discovery module 118, or the like, for determining whether the one or more white space databases identifiers match a database identifier stored in a table. The table may be stored in the memory 112 and may be accessed by the processor 110 and/or the white space database schema discovery module 118 and may include the protocol or schema that is used to communicate with the one or more databases. In an instance in which there is a match, the protocol or schema for the matching database is selected by means of the apparatus 102, such as the processor 110, the white space database schema discovery module 118, or the like, at operation 314.

In an instance in which a match is not determined, then as shown in operation 306, the apparatus 102 may include means, such as the processor 110, the communications interface 114, the white space database schema discovery module 118, or the like, for causing a DNS lookup request to be transmitted to a DNS server. A resource record stored in DNS may then be used to indicate the regulatory domain associated with a database. As shown in decision operation 308, the apparatus 102 may include means, such as the processor 110, the memory 112, the white space database schema discovery module 118, or the like, for determining whether a resource record was received that contains an indication of a protocol or schema. In an instance in which the resource record contains an indication of a protocol or schema, then at operation 314, the located protocol or schema is selected by means of the apparatus 102, such as the processor 110, the white space database schema discovery module 118, or the like.

In an instance in which a resource record does not contain an indication of a protocol or schema, then as shown in operation 310, the apparatus 102 may include means, such as the processor 110, the communications interface 114, the white space database schema discovery module 118, or the like, for causing the one or more white space databases to be queried with a current location. As shown in decision operation 312, the apparatus 102 may include means, such as the processor 110, the memory 112, the white space database schema discovery module 118, or the like, for determining whether a protocol or schema is received in response to the query. In an instance in which a protocol or schema is received than at operation 314, the received protocol or schema is selected by means of the apparatus 102, such as the processor 110, the white space database schema discovery module 118, or the like. In an instance in which the protocol or schema is not received then the method may restart at operation 302.

Advantageously, the systems and methods as disclosed herein are configured to enable a mobile terminal to roam into any regulatory domain where use of white space spectrum has been approved by the local regulator, and dynamically operate within the regulatory bounds set by the regulator. For example, the mobile terminal may determine the current protocol for communicating with a database that allows access to the white space spectrum in a particular domain.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   accessing one or more white space database identifiers, wherein the one or more white space database identifiers correspond to a white space database assigned to a region;
   determining that the one or more database identifiers do not match a database identifier associated with a schema, wherein the schema defines one or more parameters for exchanging information with a white space spectrum database;
   causing a domain name system (DNS) query to be transmitted to a DNS server;
   determining whether the DNS queried returned a resource record containing the schema; and
   in an instance in which the DNS query fails to provide a resource record containing the schema, querying one or more white space databases with a current location.

2. A method of claim 1 further comprising:
   causing one or more white space spectrum databases to be queried with a current location in an instance in which the one or more database identifiers do not match a database identifier associated with a schema; and
   receiving an indication of a schema to be used in the current location from the one or more white space spectrum databases.

3. A method of claim 1 further comprising:
   receiving a service record type record that indicates a schema that is associated with the white space spectrum database.

4. A method of claim 1 wherein the schema includes a communications protocol to access white space database information.

5. A method of claim 1 further comprising:
   causing a table to be accessed, wherein the table comprises a mapping of white space database identifiers to a particular schema that enables communication with the white space database.

6. An apparatus comprising:
   at least one processor; and
   at least one memory including computer program code, the at least one memory and the computer program code configured to, with the at least one processor, cause the apparatus to at least:
     access one or more white space database identifiers, wherein the one or more white space database identifiers correspond to a white space database assigned to a region;
     determine that the one or more database identifiers do not match a database identifier associated with a schema, wherein the schema defines one or more parameters for exchanging information with a white space spectrum database;
     cause a domain name system (DNS) query to be transmitted to a DNS server;
     determine whether the DNS queried returned a resource record containing the schema; and
     in an instance in which the DNS query fails to provide a resource record containing the schema, query one or more white space databases with a current location.

7. An apparatus of claim 6 wherein the at least one memory including the computer program code is further configured to, with the at least one processor, cause the apparatus to:
   cause one or more white space spectrum databases to be queried with a current location in an instance in which the one or more database identifiers do not match a database identifier associated with a schema; and
   receive an indication of a schema to be used in the current location from the one or more white space spectrum databases.

8. An apparatus of claim 6 wherein the at least one memory including the computer program code is further configured to, with the at least one processor, cause the apparatus to:
   receive a service record type record that indicates a schema that is associated with the white space spectrum database.

9. An apparatus of claim 6 wherein the schema includes a communications protocol to access white space database information.

10. An apparatus of claim 6 wherein the at least one memory including the computer program code is further configured to, with the at least one processor, cause the apparatus to:
    cause a table to be accessed, wherein the table comprises a mapping of white space database identifiers to a particular schema that enables communication with the white space database.

11. A computer program product comprising:
at least one computer readable non-transitory memory medium having program code stored thereon, the program code which when executed by an apparatus cause the apparatus at least to:
   access one or more white space database identifiers, wherein the one or more white space database identifiers correspond to a white space database assigned to a region;
   determine that the one or more database identifiers do not match a database identifier associated with a schema, wherein the schema defines one or more parameters for exchanging information with a white space spectrum database;
   cause a domain name system (DNS) query to be transmitted to a DNS server;
   determine whether the DNS queried returned a resource record containing the schema; and
   in an instance in which the DNS query fails to provide a resource record containing the schema, query one or more white space databases with a current location.

12. A computer program product of claim 11 further comprising program code instructions configured to:
   cause one or more white space spectrum databases to be queried with a current location in an instance in which the one or more database identifiers do not match a database identifier associated with a schema; and
   receive an indication of a schema to be used in the current location from the one or more white space spectrum databases.

13. A computer program product of claim 11 further comprising program code instructions configured to:
   receive a service record type record that indicates a schema that is associated with the white space spectrum database.

14. A computer program product of claim 11 further comprising program code instructions configured to:
   cause a table to be accessed, wherein the table comprises a mapping of white space database identifiers to a particular schema that enables communication with the white space database.

* * * * *